United States Patent
Garrett et al.

(10) Patent No.: US 8,028,270 B2
(45) Date of Patent: Sep. 27, 2011

(54) DATA DICTIONARY FILE BASED SOURCE CODE GENERATION METHOD AND SYSTEM

(75) Inventors: Andrew John Garrett, Herts (GB); James A. Martin, Endicott, NY (US)

(73) Assignee: International Business Machines Corporation, Armonk, NY (US)

(*) Notice: Subject to any disclaimer, the term of this patent is extended or adjusted under 35 U.S.C. 154(b) by 1300 days.

(21) Appl. No.: 11/558,582

(22) Filed: Nov. 10, 2006

(65) Prior Publication Data
US 2008/0115105 A1 May 15, 2008

(51) Int. Cl.
*G06F 9/44* (2006.01)
*G06F 9/45* (2006.01)
*G06F 7/00* (2006.01)

(52) U.S. Cl. ........ 717/106; 717/100; 717/136; 717/137; 707/600; 707/602

(58) Field of Classification Search .................. None
See application file for complete search history.

(56) References Cited

U.S. PATENT DOCUMENTS

| | | | |
|---|---|---|---|
| 6,832,226 B1 | 12/2004 | Parker | |
| 6,848,108 B1 | 1/2005 | Caron | |
| 6,963,875 B2 | 11/2005 | Moore et al. | |
| 7,020,660 B2 | 3/2006 | Woodring | |
| 7,293,006 B2* | 11/2007 | Beckius et al. | 1/1 |
| 7,526,498 B2* | 4/2009 | Dubovsky | 1/1 |
| 7,712,073 B1* | 5/2010 | Srinivasan et al. | 717/104 |
| 2002/0194217 A1* | 12/2002 | Hoffman et al. | 707/503 |
| 2003/0014557 A1* | 1/2003 | Berger et al. | 709/318 |
| 2003/0033317 A1 | 2/2003 | Ziglin | |
| 2003/0110191 A1 | 6/2003 | Handsaker et al. | |
| 2003/0140028 A1 | 7/2003 | Sjogren et al. | |
| 2003/0177140 A1 | 9/2003 | Debard et al. | |
| 2004/0064437 A1* | 4/2004 | Knopf | 707/1 |
| 2005/0131928 A1 | 6/2005 | Gauthey et al. | 707/101 |
| 2006/0212474 A1* | 9/2006 | McCormack et al. | 707/103 Z |
| 2007/0094278 A1* | 4/2007 | Huppert et al. | 707/100 |
| 2007/0234274 A1* | 10/2007 | Ross et al. | 717/101 |
| 2010/0114823 A1* | 5/2010 | Sykes et al. | 707/626 |

* cited by examiner

*Primary Examiner* — Insun Kang
(74) *Attorney, Agent, or Firm* — Schmeiser, Olsen & Watts; William E. Schiesser

(57) ABSTRACT

A software generation method and system. The method includes receiving by a computing system, a first data file including first data associated with an entity. The first data file includes a first file format. The first data file is converted to a second data file including a second file format. The second data file includes the first data. A data dictionary including second data is generated. Computer source code is generated within the data dictionary. The computer source code is generated from the second data. The computer source code is transferred from the data dictionary to an import agent source code editor of a software application.

32 Claims, 10 Drawing Sheets

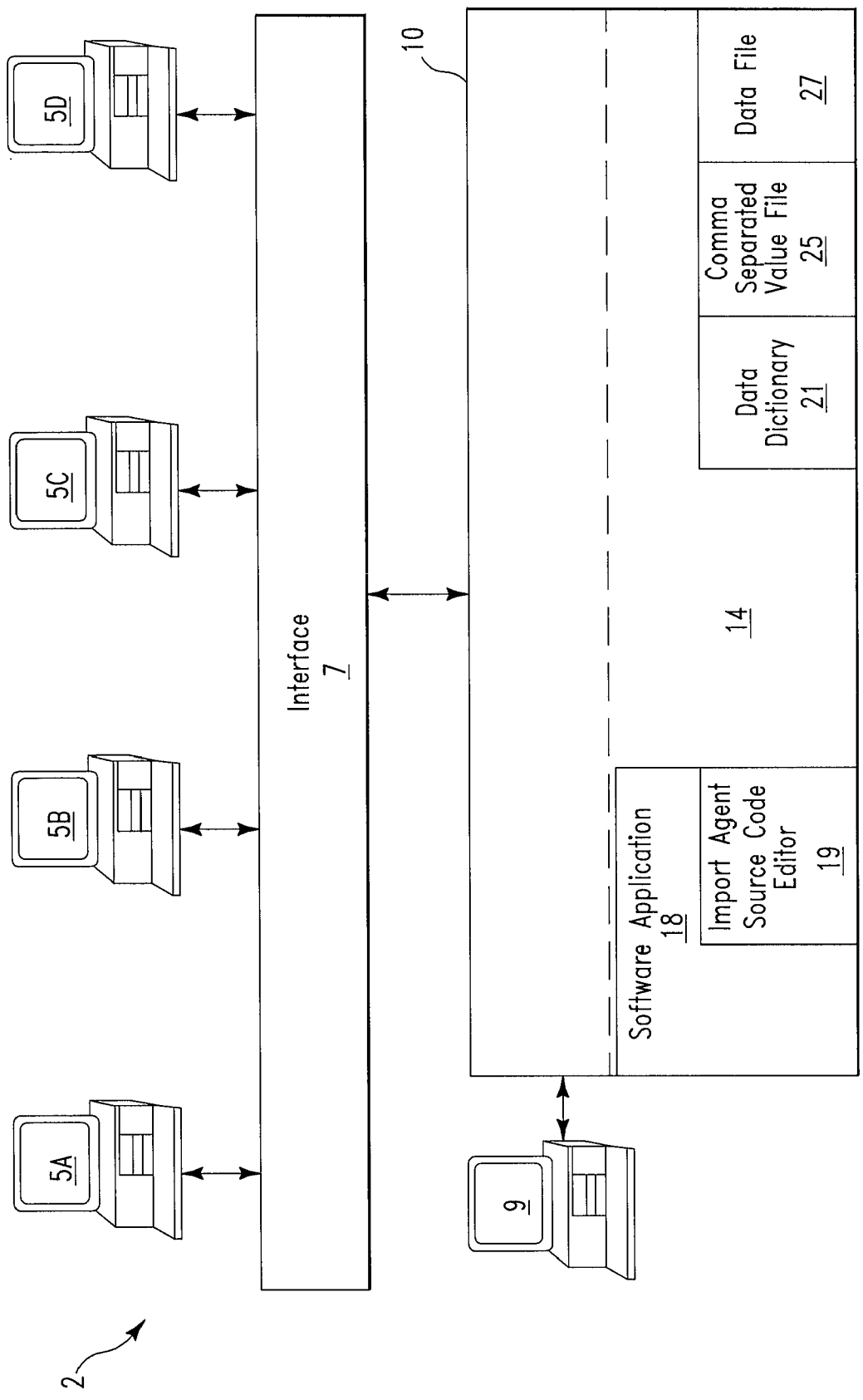

| | Project Reference | Tier Type | Contract Site Name | WAN Week Scheduled for Transformation Ion Number | WAN Week Scheduled for Transformation week commencing date (ddd-dd-mmm-yy) | PIM Number | NT Server Name |
|---|---|---|---|---|---|---|---|
| R1 | LTSB_EQX0011 | 4 | A Street, NY | 18 | Mon-06-Mar-06 | 50451350 | 87345300 |
| R2 | LTSB_EQX0012 | 2 | A Terrace, NY | 37 | Mon-17-Jul-06 | 50451034 | 87345300 |
| R3 | LTSB_EQX0013 | 3 | 8 North Street, NY | 25 | Mon-24-Apr-06 | 50451201 | 87340400 |
| R4 | LTSB_EQX0014 | 4 | B Street, NY | 18 | Mon-06-Mar-06 | 50451252 | 87341200 |
| R5 | LTSB_EQX0015 | 3 | C Street, NY | 17 | Mon-27-Feb-06 | 50451152 | 87340300 |
| R6 | LTSB_EQX0016 | RATM | Company A, Ontario | 0 | not scheduled | 99 | 87340400 |
| R7 | LTSB_EQX0017 | 4 | Company B, NY | 25 | Mon-24-Apr-06 | 50450176 | 87340600 |
| R8 | LTSB_EQX0018 | 4 | Company C, NY | 4 | Mon-28-Nov-05 | 50451229 | 87345400 |
| R9 | LTSB_EQX0019 | 4 | D Street, FL | 4 | Mon-28-Nov-05 | 50451125 | 87341400 |
| R10 | LTSB_EQX0020 | | E Street, FL | 20 | Mon-20-Mar-06 | 99 | 87345300 |

FIG. 2

| | Project Reference | Tier Type | Contract Site Name | WAN | PIM Number | NT Server Name |
|---|---|---|---|---|---|---|
| R1 → | LTSB_EQX0011 | 4 | A Street, NY | 18 | 50451350 | 87345300 |
| R2 → | LTSB_EQX0012 | 2 | A Terrace, NY | 37 | 50451334 | 87345300 |
| R3 → | LTSB_EQX0013 | 3 | 8 North Street, NY | 25 | 50451201 | 87340400 |
| R4 → | LTSB_EQX0014 | 4 | B Street, NY | 18 | 50451252 | 87345300 |
| R5 → | LTSB_EQX0015 | 3 | C Street, NY | 17 | 50451152 | 87340300 |
| R6 → | LTSB_EQX0016 | RATM | Company A, Ontario | 0 | 99 | 87340400 |
| R7 → | LTSB_EQX0017 | 4 | Company B, NY | 25 | 50450176 | 87340600 |
| R8 → | LTSB_EQX0018 | 4 | Company C, NY | 4 | 50451229 | 87345400 |
| R9 → | LTSB_EQX0019 | 4 | D Street, FL | 4 | 50451125 | 87341400 |
| R10 → | LTSB_EQX0020 | RATM | E Street, FL | 20 | 99 | 87345300 |

| | Import? | EMM Field Description | EMM Field Name | Destination | Import Type | Form Type |
|---|---|---|---|---|---|---|
| | 22a | 22b | 22c | 22d | 22e | 22f  22g |
| R1 | Yes | Project Reference | FL_ProjectRefID | Site-LTSB | String | Text |
| R2 | Yes | Tier Type | FL_LT_EquinoxTierType | Site-LTSB | String | keyword |
| R3 | Yes | Contract Site Name | FL_LT_ContractSiteName | Site-LTSB | String | Text |
| R4 | Yes | WAN Week Scheduled for Transformation Number | FL_LT_TransformWeekNum | Site-LTSB | Integer | Numeric keyword |
| R5 | Yes | WAN Week Scheduled for Transformation W/C date | FL_LT_TransformWCDate | Site-LTSB | Date | date-UK format |
| R6 | Yes | PIM Number | FL_LT_PIMSNum | Site-LTSB | String | Text |
| R7 | Yes | NT Server Name | FL_NTServerName | Site-LTSB | String | Text |

| DIM statement | Parse statement | Store value statement |
|---|---|---|
| DIM FL_ProjectRefID As String | FL_ProjectRefID =ParseLine(file_entry) | instmgr_doc.FL_FL_ProjectRefID=ProjectRefID |
| DIM FL_LT_EquinoxTierType As String | FL_LT_EquinoxTierType=ParseLine(file_entry) | instmgr_doc.FL_LT_EquinoxTierType= FL_LT_EquinoxTierType |
| DIM FL_LT_ContractSiteName As String | FL_LT_ContractSiteName=ParseLine(file_entry) | instmgr_doc.FL_LT_ContractSiteName= FL_LT_ContractSiteName |
| DIM FL_LT_TransformWeekNum As Variant | FL_LT_TransformWeekNum =ParseLine(file_entry) | instmgr_doc.FL_LT_TransformWeekNum= CInt(FL_LT_TransformWeekNum) |
| DIM FL_LT_TransformWCDate As Variant | FL_TransformWCDate =ParseLine(file_entry) | instmgr_doc.FL_LT_TransformWCDate= Cdat(FL_TransformWCDate) |
| DIM FL_LTPIMSNum As String | FL_LT_PIMSNum=ParseLine(file_entry) | instmgr_doc.FL_LT_PIMSNum= FL_LT_PIMSNum |
| DIM FL_NTServerName As String | FL_NTServerName=ParseLine(file_entry) | instmgr_doc.FL_NTServerName= FL_NTServerName |

FIG. 4B

DATA DICTIONARY FILE BASED SOURCE CODE GENERATION METHOD AND SYSTEM

FIELD OF THE INVENTION

The present invention relates to a method and associated system for generating computer source code and transferring the computer source code to a software application.

BACKGROUND OF THE INVENTION

Generating software products typically requires a process that is tedious and time consuming. Accordingly, there exists a need in the art to overcome the deficiencies and limitations described herein above.

SUMMARY OF THE INVENTION

The present invention provides a software generation method comprising:

receiving, by a computing system, a first data file comprising first data associated with an entity, said first data file comprising a first file format;

converting, by said computing system, said first data file into a second data file comprising a second file format, said second data file comprising said first data;

generating, by said computing system, a data dictionary file comprising second data;

automatically generating within said data dictionary, by said computing system, computer source code from said second data of said data dictionary file; and transferring, by said computing system, said computer source code from said data dictionary to a software application, wherein said transferring comprises retrieving a copy of said computer source code from said data dictionary and transferring said copy into an import agent source code editor of said software application.

The present invention provides a computing system comprising a processor coupled to a computer-readable memory unit, said memory unit instructions that when executed by the processor implement a software generation method, said method comprising:

receiving, by a computing system, a first data file comprising first data associated with an entity, said first data file comprising a first file format;

converting, by said computing system, said first data file into a second data file comprising a second file format, said second data file comprising said first data;

generating, by said computing system, a data dictionary file comprising second data;

automatically generating within said data dictionary, by said computing system, computer source code from said second data of said data dictionary file; and transferring, by said computing system, said computer source code from said data dictionary to a software application, wherein said transferring comprises retrieving a copy of said computer source code from said data dictionary and transferring said copy into an import agent source code editor of said software application.

The present invention provides a computer program product, comprising a computer usable medium comprising a computer readable program code embodied therein, said computer readable program code adapted to implement a software generation method within a computing system, said method comprising:

receiving, by a computing system, a first data file comprising first data associated with an entity, said first data file comprising a first file format;

converting, by said computing system, said first data file into a second data file comprising a second file format, said second data file comprising said first data;

generating, by said computing system, a data dictionary file comprising second data;

automatically generating within said data dictionary, by said computing system, computer source code from said second data of said data dictionary file; and transferring, by said computing system, said computer source code from said data dictionary to a software application, wherein said transferring comprises retrieving a copy of said computer source code from said data dictionary and transferring said copy into an import agent source code editor of said software application.

The present invention provides a process for integrating computing infrastructure, comprising integrating computer-readable code into a computing system, wherein the code in combination with the computing system is capable of performing a software generation method comprising:

receiving, by a computing system, a first data file comprising first data associated with an entity, said first data file comprising a first file format;

converting, by said computing system, said first data file into a second data file comprising a second file format, said second data file comprising said first data;

generating, by said computing system, a data dictionary file comprising second data;

automatically generating within said data dictionary, by said computing system, computer source code from said second data of said data dictionary file; and transferring, by said computing system, said computer source code from said data dictionary to a software application, wherein said transferring comprises retrieving a copy of said computer source code from said data dictionary and transferring said copy into an import agent source code editor of said software application.

The present invention advantageously provides a simple method and associated system capable of generating software products.

BRIEF DESCRIPTION OF THE DRAWINGS

FIG. 1 illustrates an example of a block diagram of a system for generating computer source code within a data dictionary and transferring the computer source code into an import agent source code editor of a software application, in accordance with embodiments of the present invention.

FIG. 2 illustrates a detailed example of the spreadsheet data file of FIG. 1, in accordance with embodiments of the present invention.

FIG. 3 illustrates a detailed example of the comma separated value file of FIG. 1, in accordance with embodiments of the present invention.

FIG. 4 as illustrated by a combination of FIGS. 4A and 4B illustrates detailed example of the generated data dictionary of FIG. 1, in accordance with embodiments of the present invention.

DETAILED DESCRIPTION OF THE INVENTION

Figure 5:
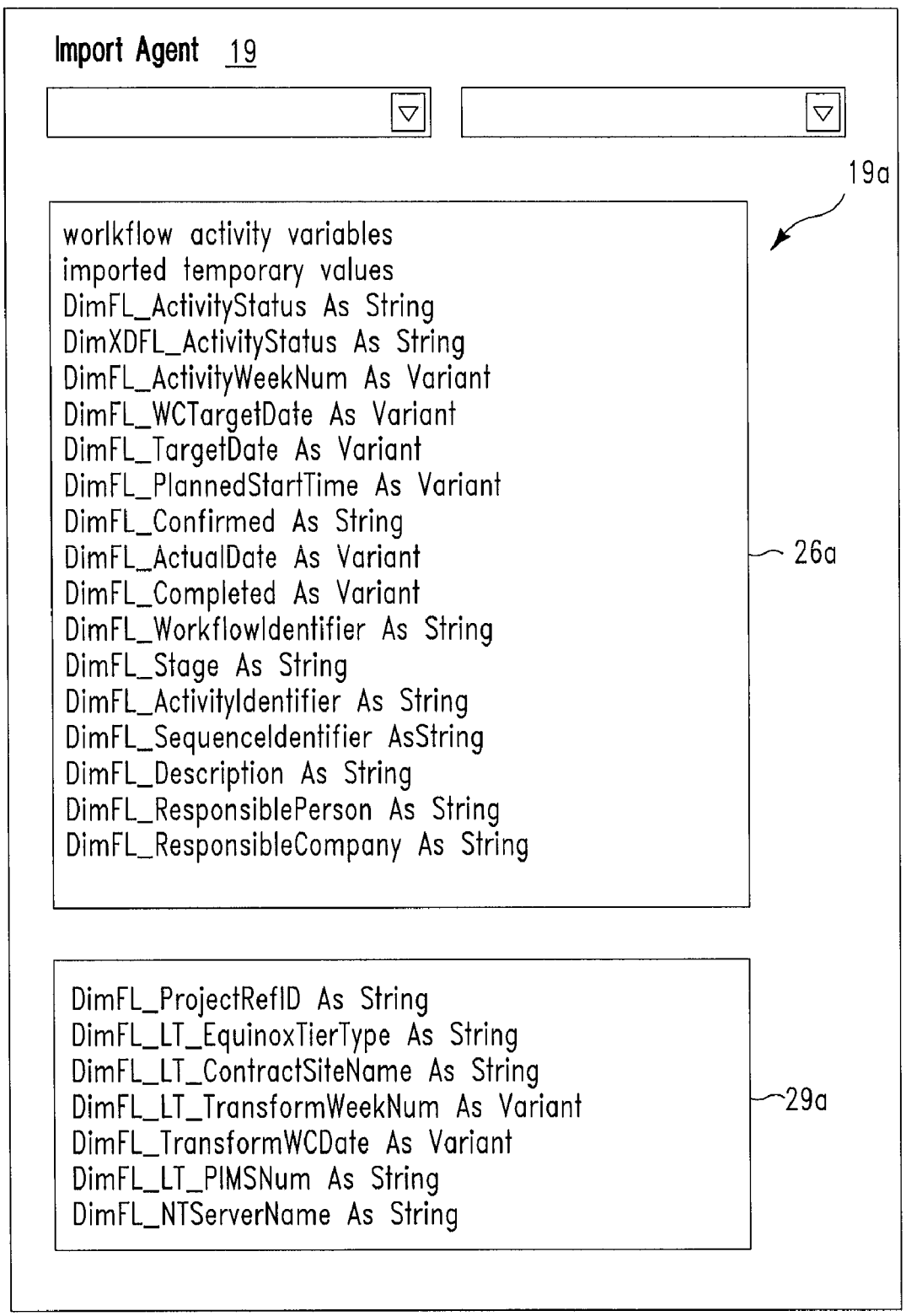
FIG. 5 illustrates an example of a first section of the import agent source code editor of FIG. 1, in accordance with embodiments of the present invention.

FIG. 1 illustrates an example of a block diagram of a system 2 for generating computer source code within a data dictionary 21 and transferring the computer source code into an import agent source code editor 19 of a software application 18, in accordance with embodiments of the present invention. The computer source code generated by system 2 may comprise any type of computer source code including, inter alia, interpretable computer source code. Interpretable computer source code is defined herein as source code that may be executed on the fly with the aid of an interpreter. The executable code enables a retrieval process for retrieving data from a data file for processing. System 2 comprises a plurality of terminals 5A . . . 5D connected to a computing apparatus 10 through an interface 7. Interface 7 may comprise any type of interface known to a person of ordinary skill in the art including, inter alia, a local area network, (LAN), a wide area network (WAN), the Internet, etc. Computing apparatus 10 may comprise any type of computing apparatus including, inter alia, a personal computer (PC), a server computer, etc. Computing apparatus 10 comprises a memory apparatus 14. Memory apparatus 14 comprises a software application 18. Software application 18 may comprise any type of software application including, inter alia, a database software application. Software application 18 comprises an import agent source code editor 19 for adding computer source code to software application 18. System 2 is used to accept a data file 27 for processing, convert data file 27 into another format (i.e., comma separated value file 25), generate a data dictionary file 21 (i.e., a spreadsheet file) for generating computer source code, and transfer the computer source code to import agent source code editor 19 of software application 18. Software application 18 uses the computer source code to retrieve the data from comma separated value file 25 for processing. Data file 27 may be inputted into computing apparatus 10 through any of terminals 5A . . . 5D or input terminal 9. Data file 27 may comprise any type of data file including, inter alia, a spreadsheet data file 27 (e.g., see FIG. 2). After data file 27 is inputted into computing apparatus 10, it is converted into a comma separated value file 25 (e.g., see FIG. 3) for ease of retrieval and processing by software application 18. In order to facilitate a retrieval process (i.e., by software application 18) for retrieving data from comma separated value file 25, computer source code may be generated and loaded into an import agent source code editor 19 so that the computer source code may be incorporated within software application 18. Data dictionary 21 (See FIG. 4) is created so that the computer source code may be generated within data dictionary 21 and transferred from data dictionary 21 to import agent source code editor 19. Generating the computer source code within data dictionary 21 (i.e., using spreadsheet formulas as described, infra) and transferring (i.e., copying and pasting as described, infra) from data dictionary 21 to import agent source code editor 19 enables a user to quickly and efficiently add computer source code (i.e., for data retrieval) to software application 18.

FIGS. 2-7 illustrate detailed examples of spreadsheet data file 27 (FIG. 2), comma separated value file 25 (FIG. 3), data dictionary 21 (FIG. 4), and import agent source code editor 19 (FIGS. 5-7) as described with reference to an example of implementation for the system 2 of FIG. 1, in accordance with embodiments of the present invention. In the following example, a bank wishes to import information (i.e., data) regarding their sites (e.g., branches, remote ATM's, business offices, etc) into a database application (e.g., software application 18) to track the migration of their wide area network to a high-speed fiber network. The bank currently has the site information stored as a spreadsheet data file (i.e., spreadsheet data file 27).

FIG. 2 illustrates a detailed example of spreadsheet data file 27 of FIG. 1, in accordance with embodiments of the present invention. Spreadsheet data file 27 has been entered into computing apparatus 14 (e.g., through one of terminals 5a . . . 5D or terminal 9) and stored in memory unit 27. Each of rows R1-R10 in spreadsheet data file 27 corresponds to an individual site for the bank. Column 28a comprises a project reference number that is a unique identification number for each bank site. Column 28b comprises a tier type column that represents a type for each bank site. Column 28c comprises a contract site name that represents a name/location of each bank site. Column 28d comprises transformation number representing a relative week from the start of the migration project that each bank site will be migrated. Column 28e comprises an actual date within the transformation week that each bank site will be migrated. Column 28f comprises a supplemental internal reference number (i.e., a PIM Number) for each bank site. Column 28g comprises a name of each server controlling wide area network traffic. Each of rows R1-R10 in spreadsheet data file 27 may be imported by import agent source code editor 19 into a document in software (i.e., database) application 18. Additionally, software application 18 may perform a calculation on each of imported rows R1-R10 of spreadsheet data file 27. Each cell in spreadsheet data file 27 will ultimately be imported by import agent source code editor 19 into a field in the document in software (i.e., database) application 18. To simplify the import process, spreadsheet data file 27 is saved as (i.e., converted to) comma separated value file 25 as illustrated in FIG. 3.

FIG. 3 illustrates a detailed example of comma separated value file 25 of FIG. 1, in accordance with embodiments of the present invention. Each of rows R1-R10 in comma separated value file 25 will eventually be parsed by import agent source code editor 19 and the parsed data will be placed in a field in the document (as described, supra,) in software (i.e., database) application 18.

FIG. 4 as illustrated by a combination of FIGS. 4A and 4B illustrates a detailed example of generated data dictionary 21 of FIG. 1, in accordance with embodiments of the present invention. In order to facilitate a creation of computer source code for import agent source code editor 19, data dictionary 21 spreadsheet is created. Each of rows R1-R7 corresponds to an associated column (i.e., one of columns 28a . . . 28g) in spreadsheet data file 27 (i.e., in FIG. 2). Column 22a comprises an import column specifying whether or not specified data in comma separated value file 25 field should be imported into software application 18. Column 22b comprises an EMM field description column that describes a purpose for each field in software application 18. Column 22c comprises an EMM field name signifying an internal name of a field within software application 18. Column 22d comprises a destination column. Column 22*e* specifies a type of document that the imported data will be placed in. Column 22*f* specifies an internal field type within the software application 18. Columns 22*g*-22*i* comprise actual generated lines of computer source code. Column 22*g* comprises DIM statements declaring within import agent source code editor 19, a variable corresponding to each field. Column 22*h* comprises parse statements which parse a value for each field from within comma separated value file 25. Column 22*i* comprises store value statements which stores a parsed value into an actual field in an actual document in the software application 18.

The code in columns 22*g* . . . 22*i* is generated by applying spreadsheet formulas to various cells in data dictionary 21. For example, in column 22*g* (i.e., DIM statement column) in data dictionary spreadsheet 21:

A formula for row 3 in column 21*n* is illustrated below:

IF(22*a*-3="No", " ", IF(22*f*-3< >"Activity", IF(22*g*-3="String", "DIM" &22*d*-3& "As" &22*g*-3, "DIM" &22*d*-3& "As Variant"), " ")

The above formula is applied to data dictionary 21 to generate a line of code as follows:
If cell 22*a*-3 (Import?) is equal to "NO" then do not create a DIM statement line of code for this data element.
If cell 22*a*-3 (Import?) is NOT equal to "NO" then DO create a DIM statement line of code for this data element.
If cell 22*f*-3 (Destination) is equal to "Activity" then do not create a DIM statement line of code for this data element.
If cell 22*f*-3 (Destination) is NOT equal to "Activity" then DO create a DIM statement line of code for this data element.
If cell 22*g*-3 (Import Type) is equal to "String" then build a DIM statement line of code using cell 22*d*-3 (EMM Field Name) and cell 22*g*-3
If cell 22*g*-3 (Import Type) is NOT equal to "String" then build a DIM statement line of code using cell 22*d*-3 (EMM Field Name) and the text "Variant"

A row is created in data dictionary 21 for each field in comma separated value file 25. All cells (i.e., comprising computer source code) under the column 22*g* in data dictionary 21 (i.e., DIM statements) are copied and pasted into a declarations area in import agent source code editor 19 (see FIG. 5). All the cells (i.e., comprising computer source code) under the column 22*h* in data dictionary 21 (i.e., Parse statements) are copied and pasted into an initialize area in import agent source code editor 19 (see FIG. 6). All cells (i.e., comprising computer source code) under the column 22*i* in data dictionary 21 (i.e., field value statements) are copied and pasted into an initialize area in import agent source code editor 19 (see FIG. 7).

FIG. 5 illustrates an example of a first portion 19*a* of import agent source code editor 19 of FIG. 1, in accordance with embodiments of the present invention. Section 19*a* illustrates an existing set 26*a* of computer source code and a block 29*a* of added (i.e., to a declarations area of import agent source code editor 19) computer source code that has been copied from all cells under column 22*g* in data dictionary 21 (i.e., DIM statements).

Figure 6:
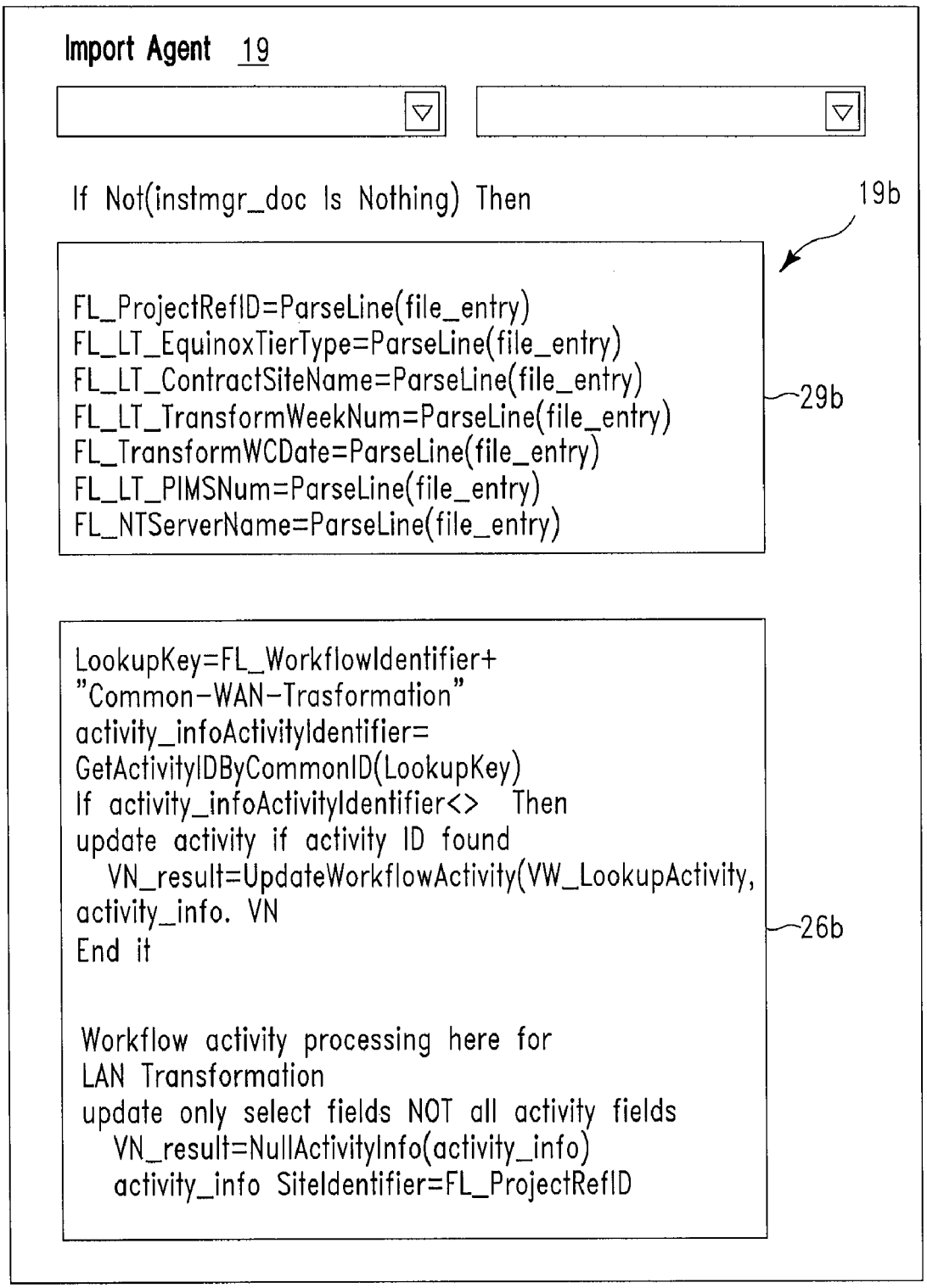
FIG. 6 illustrates an example of a second section of the import agent source code editor of FIG. 1, in accordance with embodiments of the present invention.

FIG. 6 illustrates an example of a second portion 19*b* of import agent source code editor 19 of FIG. 1, in accordance with embodiments of the present invention. Section 19*b* illustrates an existing set 26*b* of computer source code and a block 29*b* of added (i.e., to a declarations area of import agent source code editor 19) computer source code that has been copied from all cells under column 22*h* in data dictionary 21 (i.e., parse statements).

Figure 7:
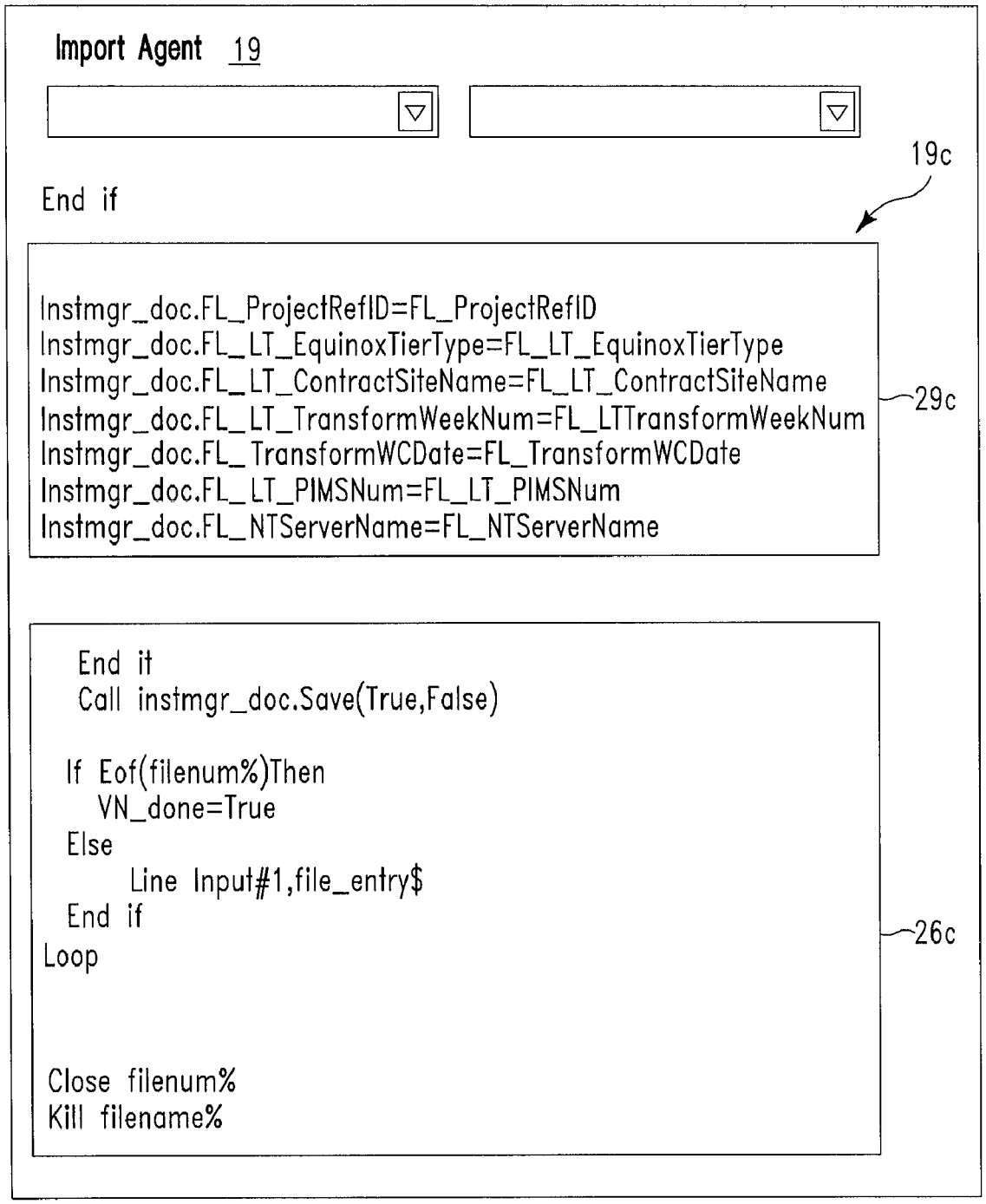
FIG. 7 illustrates an example of a third section of the import agent source code editor of FIG. 1, in accordance with embodiments of the present invention.

FIG. 7 illustrates an example of a third portion 19*c* of import agent source code editor 19 of FIG. 1, in accordance with embodiments of the present invention. Section 19*c* illustrates an existing set 26*c* of computer source code and a block 29*c* of added (i.e., to a declarations area of import agent source code editor 19) computer source code that has been copied from all cells under column 22*i* in data dictionary 21 (i.e., field value statements).

Figure 8:
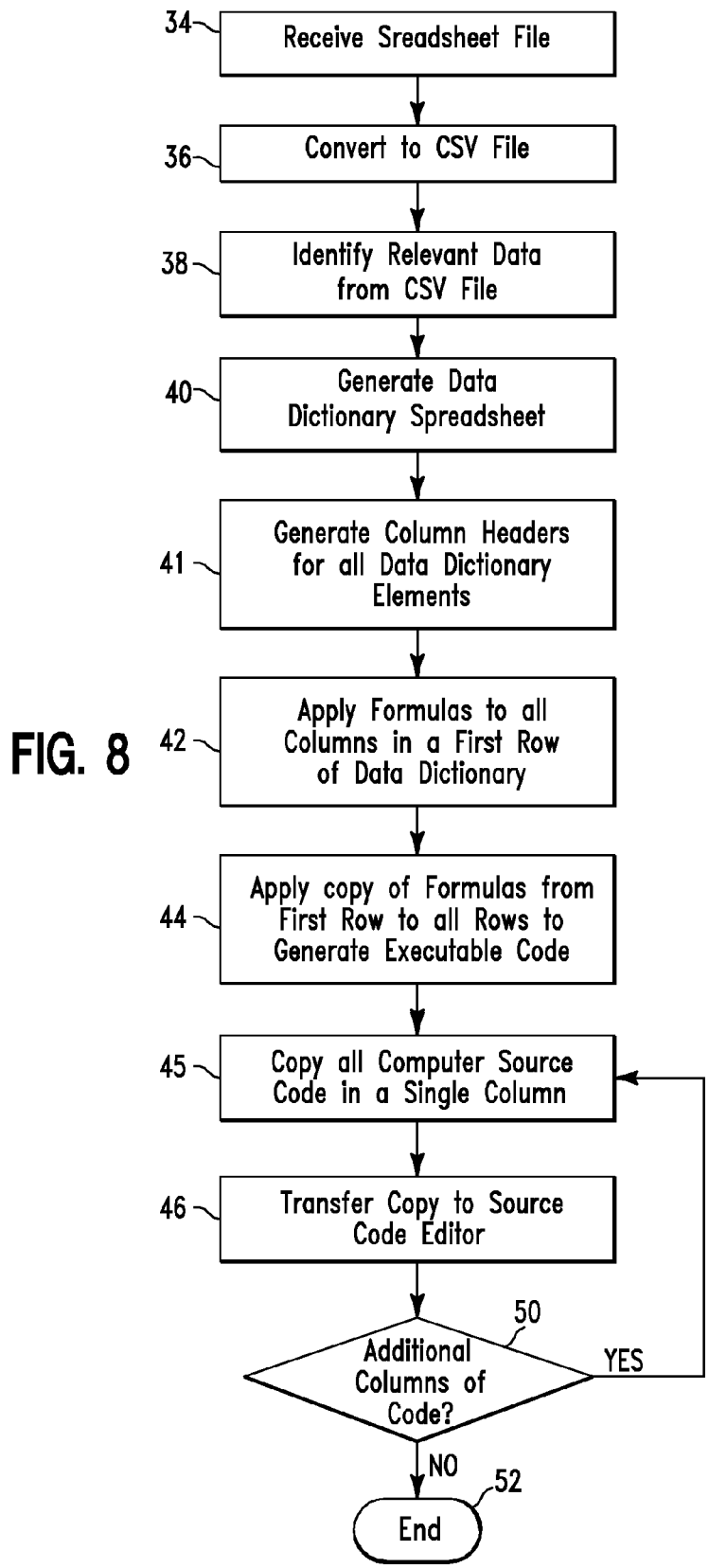
FIG. 8 illustrates an example of a flowchart describing an algorithm used by the system of FIG. 1, in accordance with embodiments of the present invention.

FIG. 8 illustrates an example of a flowchart describing an algorithm used by system 2 of FIG. 1 for generating computer source code within data dictionary 21 and transferring the computer source code into import agent source code editor 19 of a software application 18, in accordance with embodiments of the present invention. In step 34, data file 27 is received by computing apparatus 10. In step 36, data file 27 is converted into a comma separated value file 25 (CSV) for ease of retrieval (i.e., of data) and processing by software application 18. In step 38, all relevant data (i.e., for processing) from comma separated value file 25 is identified (e.g., by highlighting). In step 40, data dictionary spreadsheet file is generated/opened. In step 41, column headers for all elements in data dictionary 21 are created. In step 42, code generation formulas are generated and applied to a first row of data dictionary 21 as described with reference to FIG. 4, supra. In step 44, the code generation formulas generated and applied in step 42 are copied and pasted to all rows of data dictionary 21. Steps 42 and 44 generate the actual lines of computer source code. In step 45, all of the generated computer code in a single column is copied (e.g., using a copy function of data dictionary 21). In step 46, the copy from step 45 is transferred (e.g., using a paste function) to import agent source code editor 19. In step 50, it is determined if there is any additional columns of computer source code in data dictionary 21 that are required to be transferred to import agent source code editor 19. If in step 50, it is determined that there is additional columns of computer source code in data dictionary 21 that are required to be transferred to import agent source code editor 19, then step 45 is repeated. If in step 50, it is determined that there is not any additional columns of computer source code in data dictionary 21 that are required to be transferred to import agent source code editor 19, then the process ends in step 54.

Figure 9:
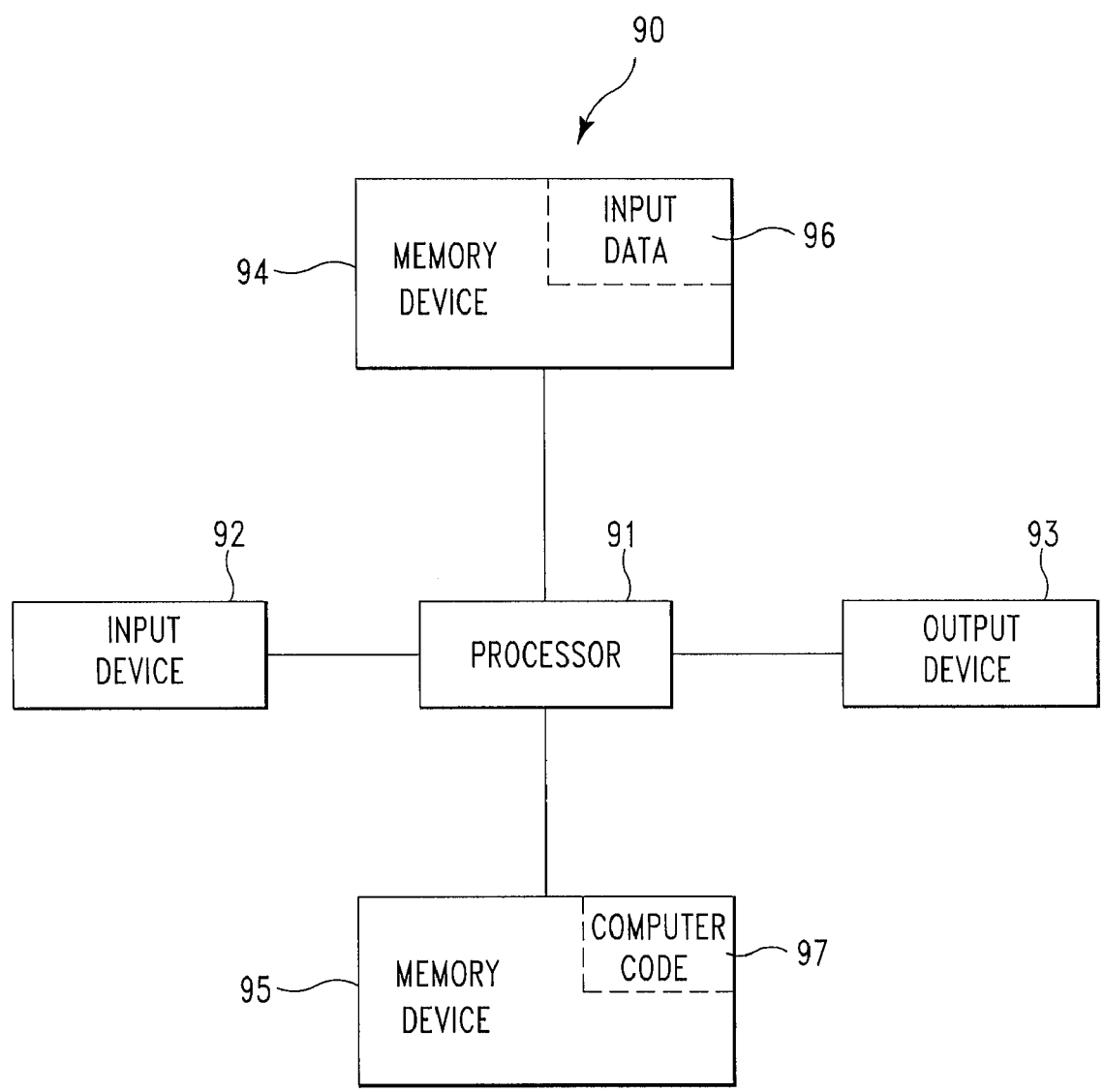
FIG. 9 illustrates an example of a computer apparatus used for generating computer source code within a data dictionary and transferring the computer source code into an import agent source code editor of a software application, in accordance with embodiments of the present invention.

FIG. 9 illustrates an example of a computer apparatus 90 (i.e., computing apparatus 10 in FIG. 1) used for generating computer source code within a data dictionary and transferring the computer source code into an import agent source code editor of a software application, in accordance with embodiments of the present invention. Computer apparatus 90 comprises a processor 91, an input device 92 coupled to the processor 91, an output device 93 coupled to processor 91, and memory devices 94 and 95 each coupled to processor 91. Input device 92 may be, inter alia, a keyboard, a mouse, etc. Output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. Memory device 95 includes a computer code 97. Computer code 97 includes an algorithm (e.g., algorithm of FIG. 8) for generating computer source code within a data dictionary and transferring the computer source code into an import agent source code editor of a software application. Processor 91 executes computer code 97. Memory device 94 includes input data 96. Input data 96 includes input required by computer code 97. Output device 93 displays output from computer code 97. Either or both memory devices 94 and 95 (or one or more additional memory devices not shown in FIG. 9) may comprise the algorithm of FIG. 8 and may be used as a computer usable medium (or a computer readable medium or a program storage device) having a computer readable program code embodied therein and/or having other data stored therein, wherein the computer readable program code comprises computer code 97. Generally, a computer program product (or, alternatively, an article of manufacture) of computer apparatus 90 may comprise said computer usable medium (or said program storage device).

Still yet, any of the components of the present invention could be deployed, managed, serviced, etc. by a service provider who offers to generate computer source code within a data dictionary and transferring the computer source code into import agent source code editor of a software application. Thus the present invention discloses a process for deploying or integrating computing infrastructure, comprising integrating computer-readable code into the computer system 90, wherein the code in combination with computer apparatus 90 is capable of performing a method for generating computer source code within a data dictionary and transferring the computer source code into an import agent source code editor of a software application. In another embodiment, the invention provides a business method that performs the process steps of the invention on a subscription, advertising, and/or fee basis. That is, a service provider, such as a Solution Integrator, could offer to periodically estimate a remaining time duration (RD) for completing a process as the process is performed. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 9 shows the computer system 90 as a particular configuration of hardware and software, any configuration of hardware and software, as would be known to a person of ordinary skill in the art, may be utilized for the purposes stated supra in conjunction with the particular computer apparatus 90 of FIG. 9. For example, memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A software generation method comprising:
receiving, by a computing system, a first data file comprising first data associated with an entity, said first data file comprising a first file format comprising a spreadsheet file;
converting, by said computing system, said first data file into a second data file comprising a second file format, said second data file comprising said first data, wherein said second file format comprises a comma separated value file format;
generating, by a computer processor of said computing system, a data dictionary file comprising second data, wherein said data dictionary file comprises a spreadsheet format comprising rows and columns forming cells, and wherein each row of said rows of said data dictionary file corresponds to an associated column of columns of said first data file, wherein said columns of said data dictionary file comprise an import column associated with data specified for importing from said second data file, a destination column, and a document type column;
automatically generating within said data dictionary file, by said computing system, computer source code from said second data of said data dictionary file, wherein said computer source code comprises interpretable computer source code;
first transferring, by said computing system, first computer source code of said computer source code from said data dictionary file to a software application, wherein said first transferring comprises retrieving said first computer source code from first cells of said data dictionary file and transferring said first computer source code into a declarations area of an import agent source code editor of said software application;
second transferring, by said computing system, second computer source code of said computer source code from said data dictionary file to said software application, wherein said second transferring comprises retrieving said second computer source code from second cells of said data dictionary file and transferring said second computer source code into a first initialize area of said import agent source code editor; and
third transferring, by said computing system, third computer source code of said computer source code from said data dictionary file to said software application, wherein said third transferring comprises retrieving said third computer source code from third cells of said data dictionary file and transferring said third computer source code into a second initialize area of said import agent source code editor.

2. The method of claim 1, further comprising:
executing by said software application, said first computer source code of said computer source code, said executing said first computer source code of said computer source code comprising issuing a first command and a second command, said first command for retrieving a portion of said first data from said second data file;
automatically retrieving in response to said first command, by said software application, said portion of said first data from said second data file; and
processing in response to said second command, by said software application, said portion of said first data that has been automatically retrieved.

3. The method of claim 2, wherein said processing said portion of said first data comprises placing said portion of said first data into a document stored within said computing system.

4. The method of claim 2, wherein said processing said portion of said first data comprises performing a calculation on said portion of said first data.

5. The method of claim 1, wherein said second data file comprises said comma-separated value file comprising a first set of columns and rows, wherein said data dictionary file comprises said spreadsheet file comprising a second set of columns and rows, and wherein each row of said second set is associated with a different column of said first set.

6. The method of claim 1, wherein said automatically generating comprises applying formulas to associated sections of said second data of said data dictionary file.

7. The method of claim 1, wherein said software application comprises a database software application.

8. The method of claim 1, wherein said computer source code comprises statements selected from the group consisting of DIM statements, parse statements, and field value assignment statements.

9. A computing system comprising a computer processor coupled to a computer-readable memory unit, said memory unit comprising instructions that when executed by the computer processor implement a software generation method, said method comprising:
receiving, by said computing system, a first data file comprising first data associated with an entity, said first data file comprising a first file format comprising a spreadsheet file;
converting, by said computing system, said first data file into a second data file comprising a second file format, said second data file comprising said first data, wherein said second file format comprises a comma separated value file format;
generating, by said computer processor of said computing system, a data dictionary file comprising second data, wherein said data dictionary file comprises a spreadsheet format comprising rows and columns forming cells, and wherein each row of said rows of said data dictionary file corresponds to an associated column of columns of said first data file, wherein said columns of said data dictionary file comprise an import column associated with data specified for importing from said second data file, a destination column, and a document type column;
automatically generating within said data dictionary file, by said computing system, computer source code from said second data of said data dictionary file, wherein said computer source code comprises interpretable computer source code;
first transferring, by said computing system, first computer source code of said computer source code from said data dictionary file to a software application, wherein said first transferring comprises retrieving said first computer source code from first cells of said data dictionary file and transferring said first computer source code into a declarations area of an import agent source code editor of said software application;
second transferring, by said computing system, second computer source code of said computer source code from said data dictionary file to said software application, wherein said second transferring comprises retrieving said second computer source code from second cells of said data dictionary file and transferring said second computer source code into a first initialize area of said import agent source code editor; and
third transferring, by said computing system, third computer source code of said computer source code from said data dictionary file to said software application, wherein said third transferring comprises retrieving said third computer source code from third cells of said data dictionary file and transferring said third computer source code into a second initialize area of said import agent source code editor.

10. The computing system of claim 9, wherein said method further comprises:
executing by said software application, said first computer source code of said computer source code, said executing said first computer source code of said computer source code comprising issuing a first command and a second command, said first command for retrieving a portion of said first data from said second data file;
automatically retrieving in response to said first command, by said software application, said portion of said first data from said second data file; and
processing in response to said second command, by said software application, said portion of said first data that has been automatically retrieved.

11. The computing system of claim 10, wherein said processing said portion of said first data comprises placing said portion of said first data into a document stored within said computing system.

12. The computing system of claim 10, wherein said processing said portion of said first data comprises performing a calculation on said portion of said first data.

13. The computing system of claim 9, wherein said second data file comprises said comma-separated value file comprising a first set of columns and rows, wherein said data dictionary file comprises said spreadsheet file comprising a second set of columns and rows, and wherein each row of said second set is associated with a different column of said first set.

14. The computing system of claim 9, wherein said automatically generating comprises applying formulas to associated sections of said second data of said data dictionary file.

15. The computing system of claim 9, wherein said software application comprises a database software application.

16. The computing system of claim 9, wherein said computer source code comprises statements selected from the group consisting of DIM statements, parse statements, and field value assignment statements.

17. A computer program product, comprising a computer readable storage medium comprising a computer readable program code that when executed by a computer processor of a computing system implements a software generation method within a computing system, said method comprising:
receiving, by said computing system, a first data file comprising first data associated with an entity, said first data file comprising a first file format comprising a spreadsheet file;
converting, by said computing system, said first data file into a second data file comprising a second file format, said second data file comprising said first data, wherein said second file format comprises a comma separated value file format;
generating, by said computer processor of said computing system, a data dictionary file comprising second data, wherein said data dictionary file comprises a spreadsheet format comprising rows and columns forming cells, and wherein each row of said rows of said data dictionary file corresponds to an associated column of columns of said first data file, wherein said columns of said data dictionary file comprise an import column associated with data specified data for importing from said second data file, a destination column, and a document type column;
automatically generating within said data dictionary file, by said computing system, computer source code from said second data of said data dictionary file, wherein said computer source code comprises interpretable computer source code;
first transferring, by said computing system, first computer source code of said computer source code from said data dictionary file to a software application, wherein said first transferring comprises retrieving said first computer source code from first cells of said data dictionary file and transferring said first computer source code into a declarations area of an import agent source code editor of said software application;

second transferring, by said computing system, second computer source code of said computer source code from said data dictionary file to said software application, wherein said second transferring comprises retrieving said second computer source code from second cells of said data dictionary file and transferring said second computer source code into a first initialize area of said import agent source code editor; and third transferring, by said computing system, third computer source code of said computer source code from said data dictionary file to said software application, wherein said third transferring comprises retrieving said third computer source code from third cells of said data dictionary file and transferring said third computer source code into a second initialize area of said import agent source code editor.

18. The computer program product of claim 17, wherein said method further comprises:

executing by said software application, said first computer source code of said computer source code, said executing said first computer source code of said computer source code comprising issuing a first command and a second command, said first command for retrieving a portion of said first data from said second data file;

automatically retrieving in response to said first command, by said software application, said portion of said first data from said second data file; and processing in response to said second command, by said software application, said portion of said first data that has been automatically retrieved.

19. The computer program product of claim 18, wherein said processing said portion of said first data comprises placing said portion of said first data into a document stored within said computing system.

20. The computer program product of claim 18, wherein said processing said portion of said first data comprises performing a calculation on said portion of said first data.

21. The computer program product of claim 17, wherein said second data file comprises said comma-separated value file comprising a first set of columns and rows, wherein said data dictionary file comprises said spreadsheet file comprising a second set of columns and rows, and wherein each row of said second set is associated with a different column of said first set.

22. The computer program product of claim 17, wherein said automatically generating comprises applying formulas to associated sections of said second data of said data dictionary file.

23. The computer program product of claim 17, wherein said software application comprises a database software application.

24. The computer program product of claim 17, wherein said computer source code comprises statements selected from the group consisting of DIM statements, parse statements, and field value assignment statements.

25. A process for integrating computing infrastructure, comprising integrating computer-readable code into a computing system, wherein the code in combination with the computing system is capable of performing a software generation method comprising:

receiving, by said computing system, a first data file comprising first data associated with an entity, said first data file comprising a first file format comprising a spreadsheet file;

converting, by said computing system, said first data file into a second data file comprising a second file format, said second data file comprising said first data, wherein said second file format comprises a comma separated value file format;

generating, by a computer processor of said computing system, a data dictionary file comprising second data, wherein said data dictionary file comprises a spreadsheet format comprising rows and columns forming cells, and wherein each row of said rows of said data dictionary file corresponds to an associated column of columns of said first data file, wherein said columns of said data dictionary file comprise an import column associated with data specified for importing from said second data file, a destination column, and a document type column;

automatically generating within said data dictionary file, by said computing system, computer source code from said second data of said data dictionary file, wherein said computer source code comprises interpretable computer source code;

first transferring, by said computing system, first computer source code of said computer source code from said data dictionary file to a software application, wherein said first transferring comprises retrieving said first computer source code from first cells of said data dictionary file and transferring said first computer source code into a declarations area of an import agent source code editor of said software application;

second transferring, by said computing system, second computer source code of said computer source code from said data dictionary file to said software application, wherein said second transferring comprises retrieving said second computer source code from second cells of said data dictionary file and transferring said second computer source code into a first initialize area of said import agent source code editor; and third transferring, by said computing system, third computer source code of said computer source code from said data dictionary file to said software application, wherein said third transferring comprises retrieving said third computer source code from third cells of said data dictionary file and transferring said third computer source code into a second initialize area of said import agent source code editor.

26. The process of claim 25, wherein said method further comprises:

executing by said software application, said first computer source code of said computer source code, said executing said first computer source code of said computer source code comprising issuing a first command and a second command, said first command for retrieving a portion of said first data from said second data file;

automatically retrieving in response to said first command, by said software application, said portion of said first data from said second data file; and processing in response to said second command, by said software application, said portion of said first data that has been automatically retrieved.

27. The process of claim 26, wherein said processing said portion of said first data comprises placing said portion of said first data into a document stored within said computing system.

28. The process of claim 26, wherein said processing said portion of said first data comprises performing a calculation on said portion of said first data.

29. The process of claim 25, wherein said second data file comprises said comma-separated value file comprising a first set of columns and rows, wherein said data dictionary file comprises said spreadsheet file comprising a second set of columns and rows, and wherein each row of said second set is associated with a different column of said first set.

30. The process of claim 25, wherein said automatically generating comprises applying formulas to associated sections of said second data of said data dictionary file.

31. The process of claim 25, wherein said software application comprises a database software application.

32. The process of claim 25, wherein said computer source code comprises statements selected from the group consisting of DIM statements, parse statements, and field value assignment statements.

* * * * *